United States Patent Office 2,963,342
Patented Dec. 6, 1960

2,963,342

PROCESS FOR RECOVERING TUNGSTEN VALUES FROM TUNGSTEN-BEARING ORE

Roger L. Pilloton, Niagara Falls, and Philip H. Crayton, Tonawanda, N.Y., assignors to Union Carbide Corporation, a corporation of New York No Drawing. Filed Dec. 9, 1957, Ser. No. 701,320

2 Claims. (Cl. 23—18)

This invention relates to a process for recovering tungsten from ores such as scheelite.

A common process for separating tungsten from scheelite ore comprises the leaching of the ore with an excess of sodium carbonate solution whereby the tungsten is solubilized and dissolved in the leach liquor as sodium tungstate. Molybdenum, a common impurity in the ore, is also solubilized and dissolved in the leach liquor as sodium molybdate. Other impurities are also dissolved in the leach liquor. To separate the molybdenum and other impurities from the tungsten the leach liquor is acidified and the acidified solution is treated with sodium bisulfide (NaSH) whereby the molybdenum is precipitated from the solution. The molybdenum is precipitated as molybdenum sulfide ($MoS_3$). In the acidification step the excess sodium carbonate present in the leach liquor is decomposed. This loss is costly and requires that additional sodium carbonate be furnished for subsequent ore leaching. Further, the molybdenum sulfide which is recovered is impure, requiring additional processing to convert the molybdenum to a more valuable form. Also the tungsten-bearing solution still contains from 0.3 to 1.0 percent molybdenum.

It is an object of this invention to provide a continuous process for the separation of tungsten from its ores.

It is another object of this invention to provide a continuous process for the separation of tungsten from its ores wherein reactants may be recovered and reused.

It is another object of the invention to provide a process wherein the tungsten is recovered substantially free from molybdenum and wherein the molybdenum may be recovered in a useful form.

Other objects will be apparent from the subsequent disclosure and appended claims.

The process which satisfies the objects of the invention comprises the steps of leaching a tungsten-bearing ore with an excess of a sodium carbonate solution to produce an aqueous leach liquor; adding sodium hydroxide to said leach liquor to produce a solution having a pH of at least about 12, cooling the leach liquor to a temperature below 0° C. but not below about —8° C. whereby ice and sodium carbonate decahydrate are precipitated from solution; separating the precipitated solids from the aqueous solution; preparing additional aqueous sodium carbonate solution from said precipitated-and-separated solids for the leaching of additional tungsten ore; adjusting the soluble silicon content and the soluble fluoride content of the concentrated supernatant solution from the ice-sodium carbonate decahydrate separation step so that the mole ratio of the soluble silicon to the molybdenum and tungsten is at least 1 to 12 and the mole ratio of soluble fluoride to soluble silicon is at least 6 to 1; acidifying said concentrated supernatant solution with a strong mineral acid to a pH below about 6; contacting the acidified solution with at least one substantially water-immiscible organic solvent selected from the group consisting of lower aliphatic ketones and lower aliphatic esters whereby tungsten values are transferred from the aqueous solution to the organic solvent; separating the pregnant organic solvent from the aqueous solution; separating the molybdenum values from the tungsten-poor aqueous solution by precipitation means; passing dry ammonia through the pregnant organic solvent whereby the tungsten values are precipitated as ammonium paratungstate; separating ammonium paratungstate from the organic solvent; roasting the separated ammonium paratungstate to tungsten oxide; and recovering, purifying, drying, and recycling gaseous ammonia evolved during said roasting of ammonium paratungstate.

In accordance with the present invention, a tungsten ore, such as scheelite is leached with an excess of a sodium carbonate solution to produce a leach liquor containing sodium tungstate and sodium carbonate. This leach liquor is treated with sodium hydroxide whereby the pH of the solution is adjusted to a value of at least 12. The solution is then cooled to a temperature below about 0° C. but not below about —8° C., the ternary invariant point temperature of the solution. By this action, most of the sodium carbonate is crystallized out of solution in the form of sodium carbonate decahydrate ($Na_2CO_3.10H_2O$) together with a considerable percentage of water. The remaining solution is strongly concentrated in tungsten.

The solid phase, consisting of sodium carbonate and ice, may be easily separated from the concentrated solution by any standard technique such as centrifugation or filtration or other suitable means.

It is important when practicing the invention that the temperature of the basic leach liquor be reduced below at least 0° C., but it should not be reduced below a temperature of about —8° C. since sodium tungstate will crystallize out below this temperature. However, maximum concentration will be effected by cooling as close to —8° C. as possible.

The molybdenum-tungsten separation is effected by adjusting the soluble silicon content of the solution remaining after separating out the ice and sodium carbonate decahydrate so that the mole ratio of the soluble silicon to the molybdenum and tungsten content of the solution is at least 1 to 12 and adjusting the fluoride content of the solution so that the mole ratio of soluble fluoride to soluble silicon in the leach liquor is at least 6 to 1, acidifying the leach liquor with a strong mineral acid to produce a solution having a pH below about 6, contacting the acidified solution with a substantially water-immiscible organic solvent selected from the group consisting of lower aliphatic ketones and lower aliphatic esters whereby tungsten values are transferred from the aqueous solution to the organic solvent, and separating the pregnant organic solvent from the aqueous solution. Following this procedure substantially all of the tungsten is transferred to the organic solvent in a very pure state with the molybdenum and other impurities remaining in the aqueous phase.

The soluble silicon and soluble fluoride must be added prior to acidification. If the silicon is not present before the acidification the titanium and molybdenum values will precipitate. If the fluoride is not present the soluble silicon will precipitate as silica upon acidification. The soluble silica may be added as a silicate and the soluble fluoride introduced as a fluoride salt. However, the silicon and fluoride are more conveniently and more effectively added as a soluble silicofluoride, for example, sodium silicofluoride, $Na_2SiF_6$ or potassium silicofluoride, $K_2SiF_6$.

The mineral acids which are suitable for reducing the pH of the solution to below 6 include hydrochloric acid, sulfuric acid and phosphoric acid. The extraction may be made more effective by increasing the acidity of the solution until it is at least about two normal in hydrogen ion.

Examples of the organic extracting solvents which are substantially water-immiscible and are suitable for use in the present invention include methylisobutyl ketone, diisobutyl ketone, butyl formate and propyl acetate.

The separation of the molybdenum and tungsten values may be increased several-fold by reducing the molybdenum to the pentavalent state prior to contacting the acidified leach liquor with the organic solvent. This may be accompanied, when necessary, by the addition of iron powder to the leach liquor. The molybdenum values are preferentially reduced to the pentavalent state. The molybdenum values in the pentavalent state are much less extractable by the organic solvent than when in the hexavalent state. However, care should be exercised not to add an excess of iron powder over that necessary to reduce the molybdenum, or tungsten will also be reduced. If the tungsten is also reduced, the advantage gained by the molybdenum reduction will be mitigated.

The molybdenum in the aqueous phase resulting from the separation technique previously described may be precipitated as calcium molybdate, molybdic oxide, or molybdenum disulfide by the addition of lime acid or sodium hydrosulfide, respectively, to the aqueous solution.

The tungsten values may be recovered directly from the organic phase by bubbling ammonia through the pregnant organic solvent. The tungsten values will precipitate directly as ammonia paratungstate which, upon separation, may then be roasted to pure tungsten trioxide. The ammonia evolved in the roasting process may be recovered, purified, dried, and recycled for further use in the recovery of tungsten from the organic solvent. The tungsten trioxide may be reduced with hydrogen to pure tungsten, if desired.

In an example of the invention, one liter of solution containing 67.6 grams of sodium carbonate, 65.7 grams of sodium tungstate, and 5.9 grams of sodium molybdate was cooled down to about $-7.5°$ C. Such a treatment produced ice crystals and crystals of sodium carbonate corresponding to 88 percent of the initial sodium carbonate in solution. These crystals were filtered from the solution.

A 17.2 ml. sample of the solution containing 5.67 grams of sodium tungstate and 0.51 gram of sodium molybdate previously treated with soluble silicon until a mole ratio of silicon to molybdenum plus tungsten of at least 1 to 12 was attained and with soluble fluoride until a mole ratio of soluble fluoride to soluble silicon of at least 6 to 1 was attained, was diluted with water to a total volume of 170 milliliters and acidified to a pH of 4 with hydrochloric acid. To this solution, were added 0.11 gram of iron whereby the molybdenum was converted to the pentavalent state. The resulting solution was agitated with 170 millimeters of methylisobutyl ketone at room temperature. Two liquid phases were obtained. The concentrations in the organic phase were 9 grams of tungsten per liter and 0.04 gram of molybdenum per liter, respectively. All the tungsten was precipitated as ammonium paratungstate when dry gaseous ammonia was blown through the organic phase.

As may be seen by the foregoing discussion, tungsten values may be recovered from ores in a very pure form by the process of the present invention. Additionally, molybdenum is also recovered in a pure and useful form. When it is further considered that the sodium carbonate and dry ammonia employed in the separation may be recovered and recycled, it may be seen that an economic advantage is provided by the present process as well as an excellent metal separation and purification.

What is claimed is:

1. A process for recovering tungsten values from a tungsten-bearing ore contaminated with molybdenum comprising leaching said tungsten-bearing ore with an excess of a sodium carbonate solution to produce an aqueous leach liquor; adding sodium hydroxide to said leach liquor to produce a solution having a pH of at least about 12; cooling the leach liquor to a temperature below 0° C. but not below about $-8°$ C. whereby ice and sodium carbonate decahydrate are precipitated from solution; separating the precipitated solids from the aqueous solution; preparing additional aqueous sodium carbonate solution from said precipitated-and-separated solids and recycling said aqueous sodium carbonate solution for the leaching of additional tungsten ore; adding soluble silicon and soluble fluoride to the concentrated supernatant solution remaining after the ice-sodium carbonate decahydrate separation when the mole ratio of soluble silicon to molybdenum plus tungsten is less than 1 to 12 and the mole ratio of soluble fluoride to soluble silicon is less than 6 to 1 and continuing said adding until the mole ratio of soluble silicon to molybdenum plus tungsten is at least 1 to 12 and the mole ratio of soluble fluoride to soluble silicon is at least 6 to 1; acidifying said concentrated supernatant solution with at least one acid selected from the group consisting of hydrochloric acid, sulfuric acid and phosphoric acid to a pH below about 6; contacting the acidified solution with at least one substantially water-immiscible organic solvent selected from the group consisting of lower aliphatic ketones and lower aliphatic esters whereby tungsten values are transferred from the aqueous solution to the organic solvent; separating the pregnant organic solvent from the aqueous solution; passing dry ammonia through the pregnant organic solvent whereby the tungsten values are precipitated as ammonium paratungstate; separating ammonium paratungstate from the organic solvent; roasting the separated ammonium paratungstate to tungsten oxide; and recovering, purifying, drying, and recycling gaseous ammonia evolved during said roasting of ammonium paratungstate.

2. A process for recovering tungsten values from a tungsten-bearing ore contaminated with molybdenum comprising leaching said tungsten-bearing ore with an excess of a sodium carbonate solution to produce an aqueous leach liquor; adding sodium hydroxide to said leach liquor to produce a solution having a pH of at least about 12; cooling the leach liquor to a temperature of about $-8°$ C. whereby ice and sodium carbonate decahydrate are precipitated from solution; separating the precipitated solids from the aqueous solution; preparing additional aqueous sodium carbonate solution from said precipitated-and-separated solids and recycling said aqueous sodium carbonate solution for the leaching of additional tungsten ore; adding soluble silicon and soluble fluoride to the concentrated supernatant solution remaining after the ice-sodium carbonate decahydrate separation when the mole ratio of soluble silicon to molybdenum plus tungsten is less than 1 to 12 and the mole ratio of soluble fluoride to soluble silicon is less than 6 to 1 and continuing said adding until the mole ratio of soluble silicon to molybdenum plus tungsten is at least 1 to 12 and the mole ratio of soluble fluoride to soluble silicon is at least 6 to 1; acidifying said concentrated supernatant solution with at least one acid selected from the group consisting of hydrochloric acid, sulfuric acid and phosphoric acid to produce a solution that is about 2 normal in hydrogen ion; reducing at least a substantial quantity of the molybdenum values which are present in the acidified solution in the hexavalent state to the pentavalent state; contacting the acidified solution with at least one substantially water-immiscible organic solvent selected from the group consisting of lower aliphatic ketones and lower aliphatic esters whereby tungsten values are transferred from the aqueous solution to the organic solvent; separating the pregnant organic solvent from the aqueous solution; passing dry ammonia through the pregnant organic solvent whereby the tungsten values are precipitated as ammonium paratungstate; separating ammonium paratungstate from the organic solvent; roasting the separated ammonium paratungstate to tungsten oxide; and recovering, purifying, drying, and recycling gaseous ammonia evolved during said roasting of ammonium paratungstate.

References Cited in the file of this patent

UNITED STATES PATENTS

| | | |
|---|---|---|
| 2,202,525 | Hixson et al. | May 28, 1940 |
| 2,390,687 | Boericke et al. | Dec. 11, 1945 |
| 2,394,362 | Burwell | Feb. 5, 1946 |
| 2,556,255 | Corosella | June 12, 1951 |

OTHER REFERENCES

Mellor: "Comprehensive Treatise on Inorganic and Theoretical Chemistry," vol. II, 1931, pages 683 and 687.

Lowry: "Inorganic Chemistry," 1931, pages 671 and 672.

West: "Mettalurgia," vol. 54, July 1956, pages 47 to 51.